United States Patent [19]
Boeckeler

[11] 3,888,662
[45] June 10, 1975

[54] METHOD OF CENTRIFUGALLY COMPACTING GRANULAR MATERIAL USING A DESTRUCTIBLE MOLD

[75] Inventor: Benjamin Clark Boeckeler, Greensburg, Pa.

[73] Assignee: Kennametal Inc., Latrobe, Pa.

[22] Filed: Feb. 9, 1973

[21] Appl. No.: 330,964

[52] U.S. Cl. ...................... 75/203; 29/420; 75/204; 75/206; 75/211; 264/63; 264/111; 264/114; 264/125; 264/317; 264/337

[51] Int. Cl. ............................ B22f 3/06; B29f 5/02

[58] Field of Search ........ 29/419, 420; 75/203, 204, 75/211; 425/DIG. 12; 249/61; 264/56, 63, 111, 109, 125, 221, 311, 313, 317, 337, 338, 334, 114, 122, DIG. 44

[56] References Cited

UNITED STATES PATENTS

| | | | |
|---|---|---|---|
| 2,304,723 | 12/1942 | Wolff et al. | 264/56 |
| 2,390,160 | 12/1945 | Marvin | 264/56 |
| 2,593,507 | 4/1952 | Wainer | 264/63 |
| 2,869,215 | 1/1959 | Smith | 264/56 |
| 2,962,790 | 12/1960 | Daniel | 264/311 |
| 3,051,567 | 8/1962 | Ziegler | 264/125 |
| 3,233,310 | 2/1966 | Corl | 264/313 |
| 3,346,680 | 10/1967 | Bush | 264/63 |
| 3,518,756 | 7/1970 | Bennett et al. | 264/63 |
| 3,539,472 | 11/1970 | Findelsen et al. | 264/111 |
| 3,549,473 | 12/1970 | Le Blanc et al. | 264/63 |
| 3,653,982 | 4/1972 | Prill | 148/31 |
| 3,705,223 | 12/1972 | Pearson et al. | 264/63 |

OTHER PUBLICATIONS

Smith, Vinyl Resins, Reinhold, N.Y. (1958), pp. 23–29.

Anon., Modern Plastics Encyclopedia Charts, Chart No. 5 "Solvents" , Plastics Catalog Corp., N.Y. (1948).

Komarek, Chemical Engineering, Dec. 4, 1967, pages 154–156.

*Primary Examiner*—Robert F. White
*Assistant Examiner*—Willard E. Hoag
*Attorney, Agent, or Firm*—Melvin A. Crosby

[57] ABSTRACT

A method for compacting granular material, especially materials of the nature of carbides and ceramics and the like in which the material is entrained in a liquid to form a slurry and is centrifuged to cause the material to form a compact in the slurry. In one form in which the invention is practiced, the compact is formed in a mold enclosure which is insoluble in the liquid of the slurry and which is soluble in another material and the mold is removed from the compact by softening or dissolving the mold from the compact.

11 Claims, 13 Drawing Figures

METHOD OF CENTRIFUGALLY COMPACTING GRANULAR MATERIAL USING A DESTRUCTIBLE MOLD

The present invention relates to the compacting of finely granulated, or powdered, materials, such as the powders of metals, alloys, cermets, ceramics, oxides, nitrides, silicides, metal carbides and other powders and is particularly concerned with the compacting of powdered materials by the application of centrifugal force thereto.

The centrifugal compacting of powders is known, including the powders of metals and alloys and ceramics. Such a process is also known in connection with the compacting of hard powders such as the powders of tungsten carbide and titanium carbide and like materials. The centrifugal compacting of materials such as the metal carbides has not, however, heretofore been attended with any degree of success for a number of reasons. Such powders can be highly reactive and can even be pyrophoric.

Powdered materials of the nature with which the present invention is particularly concerned comprise non-metallic powders, cermet powders, metal powders, metal alloy powders, oxides, nitrides, silicides, metal carbide powders, and the like and any of which, but especially the carbide powders, may be admixed with the powder of a binding material which may be a metal or a metal alloy or a mixture of metal powders.

The usual manner of forming powder mixtures of the nature referred to into compacts is to arrive at a thoroughly admixed powder mixture, as by extended milling together of the respective components of the mix, and then to press the mixed powders in a die cavity of the desired shape and to such dimensions that subsequent sintering, and concomitant shrinking, of the compacted mass will produce a workpiece near the correct size.

For holding the compacted particles together to permit handling of the compact, the mixture includes a wax or other material which will volatilize at relatively low temperature but which, at the temperature at which the compacts are pressed, namely, at room temperature, is sufficiently strong and adhesive to serve to hold the compacted particles together.

This same wax may also provide a lubricating action, or a lubricant separate from the wax may be provided, so that the particles of the powder tend to slide over one another during the compacting and thus form into a compact mass. The pressures applied during such compacting might amount to as much as from 10,000 to 60,000 pounds, or more, per square inch of projected area of the compact.

The compact, which after the pressing operation, is referred to as "green," is relatively fragile and must, therefore, be carefully handled but can be machined with proper precautions against breakage. In other cases, the "green" compact may be presintered for a certain length of time at a temperature lower than for final sintering. Such presintering drives off the wax and/or lubricating material from the material and rather loosely connects the powder particles to each other.

The presintered compact is stronger than a "green" compact and can also be handled for machining the compact, as by grinding, or turning, to approximate shape. The compact is then final sintered to its full hardness. The fully sintered compact is finally machined, as by grinding or lapping, if necessary, to give it the precise shape and size desired and to impart any critical features thereto such as a particular shape or a sharp edge or the like.

The foregoing methods of making compacts from powders, employing isostatic pressing, or mechanical pressing in dies, are generally satisfactory for many types of workpieces. In general, mechanical pressing (pill pressing) is employed for making simply shaped articles in which the section in the direction of compacting is relatively thin and wherein there is not a great deal of change in section thickness from one region of the article to another.

In other cases, however, and particularly where the compact being formed has a relatively large dimension in the direction of pressing, or where the compact varies substantially in dimension in any direction, or where the compact has a complex shape, the pill pressing method, which is unidirectional, is particularly defective. For compacts having a relatively large dimension in the direction of pressing, it is found that the powders do not flow freely enough during pill pressing to obtain uniform compaction from end to end of the compact.

Thus, the end parts of, for example, a long rod-like member, will be compacted to a higher degree than the intermediate region of the compact. Not only the friction of the particles on each other, but the friction of the powders on the cavity wall contribute to the lesser density in the central part of the compact. All of the pressing forces developed inside a compact during pill pressing must be transmitted through the powder, from particle to particle, and much friction is developed.

Such a compact, when fully sintered, is quite likely to have an hour-glass shape, and might have flaws or voids therein, for example, powder bridges, or might be afflicted with all of the defects referred to. To define the term "long" as used in the foregoing example, a compact having a lateral dimension of one inch would be considered long if it exceeded two inches in length.

Isostatic pressing causes the compacting pressure to act in all directions at the same time and can accommodate differences in sections of the compact. Powder bridges will, however, also form during isostatic pressing.

Compacts having a complex shape not only exhibit the characteristic that the powders do not flow freely into the complex configuration of the mold but, furthermore, complex compacted shapes cannot sometimes be molded in a conventional rigid cavity in a metal die and, in substantially any case, are difficult to remove from the mold cavity due to the extreme fragility of the powder compact at this stage in the manufacturing process.

Compacts of a shape which would present no difficulties in removing the compact from the mold will, if the thickness of various parts of the compact varies radically from other parts thereof, be defective, again, because of the lack of free flowability of the powders within the die cavity.

Poor flowability of the powders is particularly noted when the powders include hard sharp particles such as metal carbide particles in the mix. Carbides are generally made by reacting a metal, such as tungsten or titanium, or other metals, with carbon to form the metal carbide and this product is then crushed and ground to form particles of a desired size.

The metal carbides are extremely hard and brittle and, when crushed and ground, form sharp splinter-like or dendritic fragments. Other hard materials exhibit this same characteristic. These fragments or splinters obviously are not of such a type as freely to slide over one another and, furthermore, are so hard as to be highly abrasive so that there is not free sliding movement of the particles on each other or on the particles of binder metal or on the wall of the die cavity when the compact is being pressed. This characteristic of the powders is present in both mechanical and isostatic pressing.

For the reason of the limitation referred to above in respect of parts that can be made by compacting powder mixes of the nature referred to in the die cavity, many workpieces that could advantageously be made from powders must be formed as a solid body and then shaped by machining processes. The hardness of some materials, such as cemented carbides, is such that, when fully sintered, they can only be formed by grinding with silicon carbide or diamond type abrasives, usually the latter, and, then, only relatively slowly, so that such workpieces are extremely costly to make. Machining processes of this nature also generate a great deal of removed material which, due to the cost thereof, must be reworked and used again.

After extensive testing and experimentation, methods of, and devices for, centrifugal compacting of powders and, powder mixtures and the like, have been arrived at in which highly successful results have been obtained.

The powder mixes, according to the present invention, are caused to be relatively free-flowing by forming a "pourable" slurry thereof with a liquid vehicle and which vehicle includes a lubricating composition and also includes a wax-like holding agent. By "pourable" is meant a mixture of powder and liquid vehicle which may be Newtonian or non-Newtonian in flow characteristics.

The lubricating composition assists in the movement of the particles relative to each other and the wax-like agent holds the particles together after the centrifuging operation so that the resulting fragile compact can be handled for subsequent work operations thereon in cases when such work operations are necessary. The liquid vehicle separates the particles so they can move freely relative to each other.

Still further, extremely fine powders, when entrained in a liquid vehicle are sealed off from the atmosphere and from gases with which the powders could react.

The centrifugal force acts on each suspended or entrained particle of powder independently so that, while each particle of powder is urged in a predetermined direction by the centrifugal force, it does not forceably engage and rub against adjacent particles as is the case when powders are pressed in a more or less dry condition in a die according to conventional methods. As a result, it has been found that the slurry of powders will flow freely into the most complex mold forms and that parts of substantially any shape and proportions, including relatively long parts, can be made into compacts of uniform density by the centrifuging process.

In a conventional pressing process, the pressing force must be transmitted from the end regions of the powder through the powder by particle to particle contact to the intermediate regions thereof and, for the reasons given above, this transmission of pressure is imperfect and the powder that is spaced from the pressure applying compacting members are not compacted to the same degree as the powder adjacent the compacting members. The centrifuging of powders in a liquid vehicle substantially completely eliminates this phenomenon and the powders at every point in the compact being formed are subject to substantially the same force tending to compact the powders into the desired form.

In many cases when powders are compacted in a die by conventional methods to form a workpiece, it is necessary to machine the compact in at least one of the "green" or presintered states in order to impart certain configurations thereto that cannot be imparted to the compact simply by pressing.

When parts of this nature are formed by centrifuging, there is no necessity for green machining and/or presintering because the most complex shapes and angles which were hitherto either extremely difficult or impossible to preform by conventional pressing methods can easily be formed in the compact by the centrifuging process.

While the method of forming shapes of powdered metals by the application of centrifugal force has proved highly successful in respect of developing shapes in which the density is substantially uniform throughout, this represents only a part of the problem encountered because, after the parts are formed by the centrifuging process, it is necessary to separate them from the cavity in which they were formed for the purpose of finish machining operations where necessary and/or for the purpose of sintering.

Inasmuch as compacts formed by the centrifugal process necessarily contain a substantial quantity of liquid vehicle which will evaporate from the compact, it will be evident that the centrifuged compact will shrink somewhat as it dries. If the shape of the compact is at all complex, such as by way of having undercuts, reentrant angles and the like, such shrinkage cannot be tolerated while the compact is contained within the mold cavity because the compact would fracture and become worthless.

Furthermore, even with simply shaped articles, the possibility exists that shrinkage of the compact within the cavity would lead to portions of the compact being pulled out (plucked out) of the body of the compact as the compact shrinks because of adherence of the portion to the wall of the cavity. It is, therefore, highly important that the compact be removed from the cavity before shrinkage of the compact takes place.

Heretofore, there has been no solution of the problem of removing a centrifuged compact, especially a compact of complex shape, from the mold cavity in which it has been formed. This is one prime reason why the many benefits of centrifugal molding or powdered materials has never fully been realized in practice.

According to the present invention, a system is proposed whereby the mold cavity in which the slurry of powders is placed for centrifugal compaction thereof is made from a material which is of a soluble nature so that it can be dissolved from the compact by the use of a suitable solvent whereby shrinking of the compact following the centrifuging operation does not damage or destroy the compact.

It has been found that the novel concept according to the present invention of utilizing a soluble mold solves the most difficult problems encountered with the centrifugal formation of compacts from powdered materials. The use of soluble molds entirely eliminates the extremely severe limitations formerly encountered in respect of the configuration of pieces that can be formed from powdered materials.

Parts that formerly were required to be machined from a green or presintered or sintered solid at great expense and with the expenditure of a great deal of time can now be formed to nearly the finished shape thereof by availing of soluble molds and centrifugal compaction, thereby greatly reducing the time and labor cost involved to arrive at a completely finished workpiece thus greatly reducing the cost of the workpiece.

Still further, due to the great uniformity of conditions that prevail within the slurry of powders during the centrifugal compacting thereof, the workpieces are substantially free of flaws and non-uniformity of density to a much higher degree than it is possible to achieve through conventional pressing techniques.

With the foregoing in mind, a primary objective of the present invention is the provision of a method of, and apparatus for, effecting the centrifugal compaction of powdered materials.

A further object of the present invention is the provision of a method and apparatus for the centrifugal compaction of powder and materials wherein the powdered material comprises hard metal carbides.

Another object of this invention is the provision of a method and apparatus for the centrifugal forming of powdered metal compacts in which extremely intricate shapes can be formed.

Still another object is the provision of a method and apparatus for the forming of powdered metal compacts by centrifugal force in which extremely uniform compacts of substantially any configuration can be formed.

It is also an object of the present invention to provide a highly economical method and apparatus for the forming of powdered metal compacts and, in particular, compacts which comprise hard metal carbides.

It is also an object to provide process and apparatus for compacting extremely fine powders which will absorb gases or oxidize, or be pyrophoric, or absorb moisture, or otherwise react when exposed to the atmosphere.

The foregoing objects as well as other objects and advantages of the present invention will become more apparent upon reference to the following detailed specification taken in connection with the accompanying drawings in which:

FIG. 1 schematically shows a first step in the process according to the present invention.

FIG. 2 schematically illustrates a second step in the process.

FIG. 3 schematically illustrates the centrifuging step in the process.

FIG. 4 schematically illustrates the appearance of an exemplary mold and the compact therein following centrifuging.

FIG. 5 schematically illustrates a further step in the process.

BRIEF SUMMARY OF THE INVENTION

Figure 1:
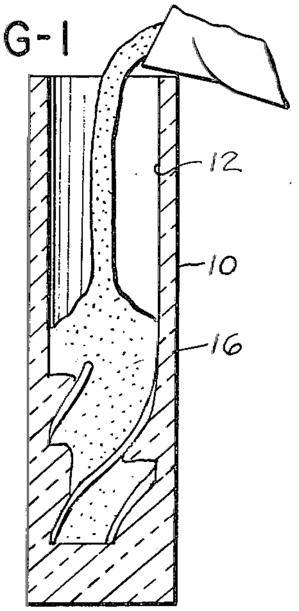

According to the present invention, the forming of workpieces from powdered materials which have been referred to above, namely, the powders of metals, alloys, cermets, oxides, ceramics, nitrides, silicides, and metal carbides, and mixtures thereof, is accomplished by entraining the powders to be molded in a liquid vehicle and compacting the powders while in the vehicle by centrifugal compaction, thereafter removing the vehicle from the compacted article and, finally, sintering the article. Prior to the sintering of the article, the article may be shaped by machining processes such as turning, sawing and grinding, if necessary, to impart a particular configuration thereto.

A particular feature of the present invention is the step of compacting the powders in a mold cavity by centrifuging the mold while containing a slurry made up of the liquid vehicle and the powders therein and thereafter removing the mold from the compacted article by solvent action.

Advantageously, the liquid vehicle is selected to have a gel or solidification point such that the centrifuging can be carried out at a temperature above the gel or solidification point of the liquid vehicle while the removing of the mold from the compacted article is carried out at a temperature below the gel or solidification point of the liquid vehicle.

In the practice of the invention, the material from which the mold is made, and in which mold the cavity which determines the shape of the compacted article is formed, is made of a material which is totally inert to the liquid vehicle fraction of the slurry which is placed therein for the centrifuging operation.

The material from which the mold is made, however, is subject to solvent action in order to dissolve the mold, or at least to soften the mold to the point that it can be removed from the compacted article without damage to the article, while the solvent is inert to the material of the compacted article and is preferably inert to the liquid vehicle fraction of the slurry and immiscible therewith.

A number of possibilities present themselves in this respect. For example, the mold material may be polyvinyl alcohol and the solvent therefor can be water, while the liquid fraction of the slurry consist, basically, of trichlorethane or perchloroethylene.

Alternatively, the mold material may be methyl methacrylate and the basic composition of the liquid fraction of the slurry can be water. With the methyl methacrylate material employed for the mold, the solvent therefor can be methylene chloride. The foregoing are merely examples of the basic combinations that can be employed in respect of the liquid vehicle of the slurry and the mold material and solvent therefor and further examples will be developed in the detailed specification and still others will suggest themselves to those skilled in the art.

The mold material must have the property of some physical strength so that it will not deform under the pressures developed during the centrifuging operation as the result of forces as high as from 70 to 1,000 times the force of gravity. The mold material should, furthermore, be relatively stable dimensionally until softened by the solvent therefor and it is preferably an inexpensive, easily worked, material.

In the forming of the mold, when polyvinyl alcohol is employed, this material can be plasticized by the addition thereto of glycerol to such a degree that the polyvinyl alcohol can readily be worked, as by injection molding, to form mold members. Similar practices can be employed when making mold members out of other materials. Methyl methacrylate is also a material from which molds can be made.

The molds according to the present invention can be so constructed as to be substantially self supporting, and in which case the minimum amount of external support is required for the molds during the centrifuging operation. It is also possible, however, to make the molds in such a manner that external support during centrifuging is necessary.

Molds requiring external support can be made, for example, by repeatedly dipping a model into a solution of the mold material, for example, a solution of polyvinyl alcohol in water and after a certain number of dipping operations, sufficient wall thickness will be built up to define the mold cavity while permitting the mold to be supported externally during the centrifuging operation. After dipping and drying, the mold is stripped from the model.

Specific examples and procedures for compounding slurries and for making molds will be detailed in the following specification.

The advantages that attend the forming of compacts according to the present invention are that the compacts can be made to substantially any configuration, including configurations which are impossible to arrive at by known mechanical and isostatic pressing techniques. Furthermore, compacts made according to the present invention prove to be more free of pits and flaws than compacts made by mechanical of isostatic pressing and are, therefore, of higher quality with fewer rejects.

A particular benefit obtained by making compacts according to the present invention is that extremely fine particles, down to submicron size, can readily be processed to form compacts because the powders are entrained in and protected by the liquid vehicle until the powders are in solid form as a compact. This is important in respect of extremely fine powders because the surface to volume ratio of such fine powders is so extremely high that the powders readily react with the atmosphere and may even react so rapidly as actually to be pyrophoric.

The only way to handle such extremely fine powders in the dry state is to maintain the powders blanketed by an inert gas, such as argon, and to maintain a condition wherein the powder is sealed off from the atmosphere by an inert blanketing gas during mixing and blending of the powders is virtually impossible, or at least very difficult and expensive. Extremely fine powders can be manufactured successfully, but have not, heretofore, been used in commerce for the particular reasons given above.

The present invention provides a method for handling such powders because, once the powders are entrained in the liquid vehicle, the powders are protected from reaction with the surrounding atmosphere and can be processed into the form of compacts which are then dried under inert gas and at which time the powders are no longer highly sensitive to atmospheric conditions because the particles are blanketed from the atmosphere by the lubricant or wax of the temporary holding agent.

DETAILED DESCRIPTION OF THE INVENTION

Referring to the drawings somewhat more in detail, FIG. 1 shows a mold 10 having a cavity 12 therein with the open end of the mold being adapted for being closed by cap 14. A closure cap is not a necessity. The cavity 12 may, for example, accurately define the outline of a tool having spiral flutes, such as an end mill. The particular mold illustrated is purely exemplary. The mold, in practice, can define a cavity of substantially any shape.

In practicing the process according to the present invention, the mold cavity receives a predetermined amount of pourable slurry 16 which may be supplied thereto in any suitable manner. This slurry is a flowable mixture of powdered material, a temporary holding agent therefor, such as a waxy, a lubricant to promote free flowability of the particles of the slurry over each other, and a liquid vehicle.

EXAMPLE I

One composition that was employed as the liquid vehicle for a slurry in the practice of the present invention is set forth in the following table:

| | |
|---|---|
| 1, 1, 1, Trichloroethane | 100.0 milliliters |
| Paraffin Wax Having a Melting Point of about 137 degrees Fahrenheit | 20.0 grams |
| Vinyl Resin in the Form of a Copolymer of Ethylene and Vinyl Acetate | 4.0 grams |
| A surface Active Agent in the Form of a Tertiary Amine Having One Fatty Alphyl Group and Two Polyoxyethylene Groups Attached to the Nitrogen | 2.0 grams |

The vinyl resin above referred to was purchased from E. I. du Pont de Nemours and Co. under their brand name Elvax 260 and is a material which is compatible with parafin wax and strengthens and reinforces the wax. The vinyl resin increases the adhesion between the wax and the solid particles in the slurry.

The surface active agent above referred to, sometimes referred to as a surfactant, is sold by Armour Industrial Chemical Co. under the name of Ethomeen S/14. A surfactant of the nature referred to is a material which coats the particles and controls the surface charge thereof thereby, in turn, controlling the degree of attraction or repulsion between the particles when suspended in the liquid vehicle.

This liquid vehicle has a gel point of about 92° Fahrenheit.

One typical carbide powder is made as follows:

WC (tungsten monocarbide) — about 94.5% by weight

Co (cobalt metal) — about 5.5% by weight

The powders are ground together in naptha containing paraffin wax until reduced to about 0.90 Fisher subsieve particle size and the powder was then dried. The powder, when dry, contains about 0.50 percent by weight of paraffin wax.

The dried powder mix is admixed with the liquid vehicle in the amount of about 90 milliliters of vehicle to about 1 kilogram of powder and is then shaken violently until substantially homogeneous.

The mold 10 was made of polyvinyl alcohol manufactured by E. I. du Pont de Nemours and Co. and described as Elvanol 5105. The polyvinyl alcohol in powder form was blended with one part by weight of glycerol to four parts of polyvinyl alcohol to form a plastic mass and was injection molded to precision shape.

Figure 2:
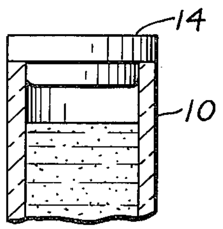

After a predetermined amount of slurry has been placed in the cavity 12 of the mold 10, the cap 14 may be put in place and the mold then appears as shown in FIG. 2. The slurry at this time is substantially uniform throughout.

Figure 3:
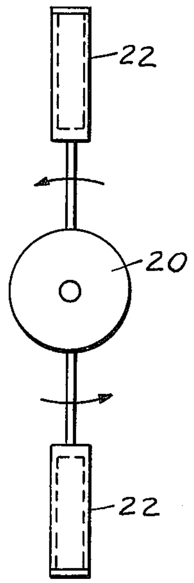

Either immediately, or after a waiting period, the filled molds are placed in a centrifuge, one of which is diagrammatically illustrated at 20 in FIG. 3. The centrifuge 20 in FIG. 3 has chambers 22 into which the molds are placed so that when the centrifuge rotates at high speed, the slurry is driven toward the end of the mold opposite the cap 14.

Inasmuch as the particles of material in the slurry are heavier than the liquid fraction thereof, the particles will tend to settle out toward the bottom of the slurry so that if the molds, following filling thereof, are placed upright for a period of time, there will be some settling out of the metal particles in the slurry toward the bottom thereof which will tend to somewhat shorten the centrifuging process.

In certain cases, however, the particles of metal in the slurry may be so fine that the settling of the slurry in the aforementioned manner is so slow that no advantage is gained from leaving the molds stand after they have been filled.

Figure 4:
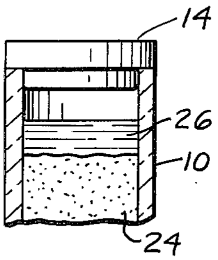

The centrifuging of the molds in the centrifuge continues until a fairly dense compact has formed in the mold as indicated at 24 in FIG. 4 and wherein it will be seen that above the compact 24 is a body of vehicle at 26 from which substantially all of the particles have been centrifuged.

As an example of centrifuging time and speed, assuming the articles shown in FIG. 4 at 24 is about three quarters inches in diameter and about four inches long, the centrifuging might take place at such a speed that a force of about 300 G's, namely, about 300 times the force of gravity is developed within the slurry and centrifuging might continue for about 20 hours or longer. A temperature of about 100° Fahrenheit is also maintained to keep the slurry above the gel point of the liquid vehicle.

After the centrifuging operation has been completed, the molds are removed from the centrifuge and the supernatant liquid on top of the settled compact in the mold cavity is poured off. The next operation, and which is extremely important according to the present invention, is the dissolving of the mold from the compact, or the softening of the mold on the compact.

The first step in this operation is to cool compact and mold below the gel point of the liquid vehicle in order to strengthen the compact and enable it to resist strains which may develop during softening and dissolving of the mold prior to removal from the compact. In this example, the mold and compact were air cooled to about 60° Fahrenheit and held at this temperature for several hours.

Figure 5:
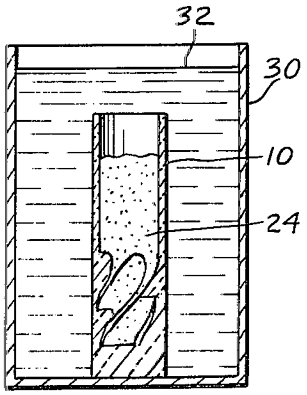
Figure 6:
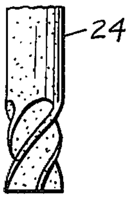
FIG. 6 illustrates a compact recovered from the mold following the step illustrated in FIG. 5 and prior to drying the compact.

The next step is to dissolve and soften the mold. This step is schematically illustrated in FIG. 5 where it will be seen that the mold with the compact therein is placed in a tank 30 containing a solvent or a softening agent 32 for the mold material. At this point, it is to be understood that the mold can be manufactured of any of a great many materials which exhibit the characteristic of sufficient mechanical strength to withstand the forces encountered during the centrifuging operation while being insoluble in respect of any fraction of the liquid portion of the slurry, and while still being readily soluble in a solvent which will not in any way adversely affect the compact within the mold.

In the case of the polyvinyl alcohol mold, the mold is placed in water at about 40° Fahrenheit. In about 16 hours, the mold was partially dissolved and the undissolved portion was so soft it could be stripped from the compact easily without damage to the compact.

The compact is then dried for 72 hours at about 70° Fahrenheit in air. The dried compact is then sintered under about 200 microns absolute pressure at about 2800° Fahrenheit for ½ hour. Shrinkage of the compact during sintering, expressed as the ratio of the dimension of the unsintered compact to the dimension of the sintered compact, is about 1.25 to 1.27, namely, about 20.0 to 21.3 percent linear shrinkage of the "green" compact.

Several examples of materials that can be used for the mold will be given, hereinafter, but one that has been found to be particularly beneficial for a number of reasons is a grade of polyvinyl alcohol. This material, it has been found, upon being plasticized by the addition of about 20 percent by weight of glycerol, can be formed, as by injection molding, to mold shapes of substantially any desired size and configuration; is possessed of adequate strength to withstand all forces encountered during the centrifuging; permits ready handling of the molds during the carrying out of the process; is totally inert to certain usable liquid vehicles and additives thereto; and is readily soluble in water.

By readily soluble is not meant instantaneously or extremely rapidly soluble, but soluble in such a manner that the mold eventually dissolves from the workpiece or softens to the extent it can easily be stripped from the workpiece without the workpiece being damaged by any shrinkage of the workpiece in the mold cavity or during removal from the mold cavity.

It is important to note that, while the mold and compact are in the solvent 32, the drying out of the compact is inhibited so that shrinkage thereof will be extremely minor, and possibly, nonexistent. Therefore, the mold will become softened in the solvent and either fall away from the compact or become so soft it can easily be removed from the compact thereby exposing the compact without any damage thereto whatsoever.

The compact, now free of its confining mold, can be dried by any suitable technique, leaving only the compacted powdered material, the temporary holding agent therein and other residues which will leave the compact when the compact is sintered.

It is understood that the compact at this time is fragile and must be handled with care. It can be compared with, but is somewhat stronger than, compacts of powdered material that are removed from the pressing die in a compacting press, or which have been formed by isostatic pressing. The same care must be exercised in handling the compacts and the same procedures can be followed for sintering the compacts.

Sintering of the compacts may be carried out in two steps, or in a single step. If machining of the compact is required, the compact may be strengthened by isostatic pressing or an initial presintering step may be carried out which drives off the temporary holding agent and fuses the metal particles together to such an extent that the compact can be handled for machining operations whereupon the final sintering operation is carried out during which the compact assumes the final condition thereof.

Normally, however, compacts made according to the present invention are more resistant to breakage than any compacted articles and can more readily be handled in the "green" state so that isostatic pressing or presintering is not often required before machining.

It will be understood that, in the normal course of events, a great many molds would be made and processed at one time. The usual centrifuge which will develop the forces referred to is of substantial size and will receive a plurality of molds all of which can be centrifuged at one time. It has been found that the molds are quite inexpensive to manufacture and the centrifuge is relatively inexpensive to operate and, accordingly, the present method offers the opportunity of producing workpieces on a large scale at quite economical costs.

In particular, the present invention offers the opportunity of forming compacts of such configuration that pressing thereof according to conventional practices would be virtually impossible or would result in a rejection of such a large percentage of workpieces made as to make the usable workpieces quite expensive.

Following is an example in which an alternate material is used for the molds and a solvent therefor. It is understood that in any case, when a mold material and solvent therefor is selected, the liquid fraction of the slurry is so selected that there is no reaction between the mold material and the liquid fraction of the slurry or between the solvent for the mold material and the compact during the dissolving of the mold material.

EXAMPLE II

Liquid vehicle amounting to 375 milliliters consisting of a water base with the following materials dissolved therein:

| | |
|---|---|
| Polyvinyl alcohol | 30.8 grams |
| Glycerol | 7.4 grams |
| Surfactant | 8.0 grams |
| Dyestuff | 0.9 grams |
| Germicide | 0.5 grams |

The polyvinyl alcohol above referred to is a product of E. I. du Pont de Nemours and Co. and is identified as type 71–30. As dyestuff, Congo Red was employed, and, as a germicide, a product of Dow Chemical Co. sold under the name of Dowicide A.

The powder fraction of the slurry contained 88.84 percent by weight tungsten monocarbide, 10.80 percent by weight cobalt and about 0.36 percent by weight paraffin. The powders and paraffin were milled together in the presence of naptha to about 0.76 Fisher subsieve particle size and then dried.

Two kilograms of the powder were mixed with the 375 milliliters of liquid vehicle and violently agitated to form a slurry. The slurry was then poured into a Lucite mold 2 ½ inches inside diameter by 2 ¾ inches outside diameter by 2 ½ inches long. Lucite is the trade name for a methyl methacrylate type plastic, manufactured by E. I. du Pont de Nemours and Co.

The Lucite mold containing the slurry was then placed on a centrifuge and rotated at 700 revolutions per minute producing a force of about 300 G's. After 16 hours of rotation, the powder had settled into a dense compact. Centrifuging temperature was 105° Fahrenheit.

The mold containing the compact was then removed from the centrifuge, and the supernatant liquid was decanted. Mold and compact were then held at a temperature of 6° Fahrenheit for a period of 16 hours.

The mold and compact were then placed in liquid methylene chloride. This dissolved away the Lucite mold leaving a clean, well formed compact with the exact shape of the mold. The compact was then allowed to dry for ten days at ambient followed by two days at 160° Fahrenheit.

The dried compact was extremely strong and suitable for secondary forming in the "green" state by operations such as sawing, lathe turning, milling and grinding. It had a green density of 6.30 grams per cubic centimeter.

A piece of the compact about 1.98 inches long by 0.86 inches wide by 0.26 inches thick was then sintered at 2575 degrees Fahrenheit for 30 minutes under about 100 to 200 microns absolute pressure. shrinkage factor expressed as the ratio of the dimension of the unsintered compact to the dimension of the sintered compact was about 1.33 to 1.35. The sintered piece had a hardness of 88.6 on the Rockwell A scale.

Figure 7:
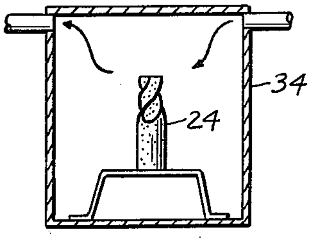
FIG. 7 shows a drying operation carried out on the compact prior to the sintering thereof.

While the compact, following the stripping of the mold therefrom, can, in many cases, merely be air dried, it is also possible to place the compact 24 in an enclosure 34 and to pass a drying gas, which may be inert, thereover while in the enclosure 34 as shown in FIG. 7.

It will be apparent from the foregoing that the present invention discloses a method and apparatus and devices for compacting powdered materials in which superior end results are obtained, due to the greatly reduced number of pits and flaws to be found in the compact, while at the same time permitting the compact to be made to configurations that it would not be possible to make by any other molding procedure.

For example, the work member illustrated in the drawings is one having spiral flutes formed therein as, for example, for an end mill and a work member of this type cannot be molded by any known mechanical or isostatic pressing method.

The end mills that are now made from carbide materials are made by diamond grinding solid sintered rods to form the flutes therein and such machining of the rod-like compacts to form the flutes therein is very costly. The present invention discloses how such work members could be formed so as to require the minimum amount of machine work thereon after compacting.

The invention has been disclosed in respect of the molding of hard carbide materials but other materials can also be compacted utilizing the process of the present invention. For example, any kind of metal powders or ceramic or cermet powders can be compacted utilizing the procedure according to the present invention.

EXAMPLE III

The following example shows the compaction of a stainless steel slug. In this case, the powdered material had a sleeve size of minus 100 mesh and the following analysis: chromium — 17 percent; nickel — 13 percent; molybdenum — 2.5 percent; carbon — 0.03 percent; iron — balance. The apparent density of the powder was 2.7 grams per cubic centimeter. In milling 2300 grams of the powder were charged into a rod mill and milled with about 370 milliliters of perchloroethylene and 23 grams of Ethomeen S/15. The milling proceeded for four days during which the perchloroethylene was added in increments to make up a total of 570 milliliters while the Ethomeen was added in increments to make up a total of 446 grams. About 23 grams of paraffin wax with a melting point about 137° Fahrenheit were also added.

The Ethomeen referred to is a cationic surface active agent and consists of a tertiary amine having one fatty alkyl group and two polyoxyethylene groups attached to the nitrogen.

The slurry was then placed in a polyvinyl alcohol thin walled mold which was externally supported in a carrier with the cavity in the mold being two inches in diameter. The mold and the contents therein were centrifuged to develop a force of 200 times the force of gravity in the slurry material for about 16 hours.

The supernatant liquid on top of the compacted slug was then poured off and the mold and compact were cooled to a temperature of about 10° Fahrenheit for 1 ½ hours.

The compact and the polyvinyl alcohol film were then removed from the carrier therefor and the film was then wetted down to cause it to become soft and was stripped from the compact. The compact was then dried in air for one day at ambient temperature and for two days at 130° Fahrenheit.

Two slugs were made in the aforementioned manner and one was hydropressed at 50,000 pounds per square inch resulting in a green density of the compact of 4.71 grams per cubic centimeter. Theoretical density for the powdered material is 8.03 so that the compact was 58.66 percent of theoretical density.

The second slug was not hydropressed and was found to have a green density of 4.11 grams per cubic centimeter or 51.18 percent of theoretical density.

The second slug was hydrogen sintered at between 1400° to 2100° Fahrenheit for 1 hour and then at 2100° Fahrenheit for 1 hour.

The end result was a dense stainless steel compact substantially free of pits and flaws. More specifically, the slug had a hardness of 50 to 84 on the Rockwell B scale and a specific gravity between 6.83 and 6.86 which is somewhat higher than 85 percent of theoretical density.

The compacting of the stainless steel powder according to the present invention produced a greater sintered density in the compact than can be obtained by conventional pressing techniques at 80,000 pounds per square inch.

Further examples of the practice of the invention are given below.

The next example is the formation of a compact from a powder containing only one phase, namely, aluminum oxide of high purity.

EXAMPLE IV

Solid powders charged were:

| | |
|---|---|
| Aluminum Oxide ($Al_2O_3$) | 299.25 grams |
| Magnesium Acetate ($MgC_4H_6O_4$) | 2.39 grams |
| Yttrium Nitrate ($Y\ N_3O_9$) | .46 grams |
| | 302.10 grams |

The aluminum oxide used was obtained from Adolph Mellar Co. It was 99.987 percent pure and was described as 0.3 micron particle size.

The powders above were mixed with 1,200 milliliters of methanal and milled in a ball mill constructed of aluminum oxide using aluminum oxide balls as grinding media. Milling time was 5 hours, after which the slurry was removed from the mill and dried.

The dried powder was then made into a slurry using 750 milliliters of methylene chloride containing 4.5 grams of paraffin wax and 3.0 grams of a surface active agent which was a dialkyl quarternary ammonium chloride derived from a fatty acid, Arquad 2C-75 made by Armour Industrial Chemical Co. This slurry was then ground for 1 ¼ hours in an aluminum oxide ball mill with aluminum oxide balls as grinding media.

The slurry was then poured from the mill through a 60 mesh screen into a thin walled polyvinyl alcohol film which was supported from the outside by a 2 inch square mold cavity made of epoxy plastic. This mold cavity was strong enough to withstand the forces developed during centrifuging.

The mold and slurry was then placed in a centrifuge and rotated for 4 ⅓ hours at a speed which generated a centrifugal force equal to 215 times the force of gravity.

Mold and compact were then removed from the centrifuge and the clear, transparent supernatant liquid decanted. The polyvinyl alcohol film and the compact were then removed from the epoxy plastic mold cavity, and water was applied to the polyvinyl alcohol film. The water weakened the film, permitting it to be removed from the compact without causing any "pluck out" or surface damage.

The compact was then dried for 36 hours at ambient and under vacuum at room temperature for 16 hours. The dry compact was then placed in a flexible rubber bag and hydropressed at 35,000 pounds per square inch isostatic pressure.

The compact was then sawed into green pieces 0.250 inches square by 0.950 inches long and sintered under vacuum at 1500° Centigrade for 30 minutes. Shrinkage of the green pieces during sintering, expressed as the ratio of the dimension of the unsintered compact to the same dimension after sintering, was 1.24 to 1.26. Average transverse rupture strength of the test pieces was 24,000 pounds per square inch. The transverse rupture test used is described on Page 16 of "Properties and Proven Uses of Kennametal Hard Carbide Alloys" 1972 edition.

Figure 8:
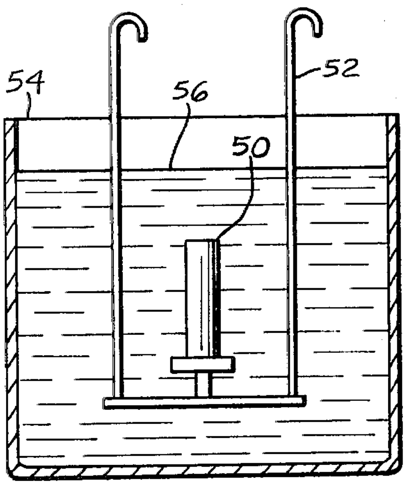
FIG. 8 is a view showing a dipping frame for dipping forms to form molds.
Figure 9:
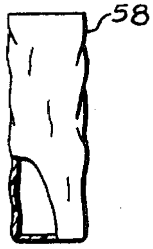
FIG. 9 shows a typical mold made by the dipping process after removal thereof from the dipping form.
Figure 10:
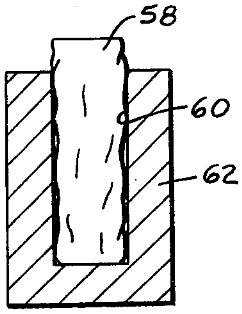
FIG. 10 shows the mold of FIG. 9 inserted into a rigid supporting carrier.

The example next to be given is a detailed example involving the use of a mold made by a dipping process. The manner in which the mold is made and used will be seen upon reference to FIGS. 8 through 13, wherein FIG. 8 shows a form at 50 carried on a frame 52 with the frame supporting the form while the form is dipped into a container 54 containing mold forming solution 56. After a number of dippings of the form, a sufficient film is built up thereon to form the desired mold. The built up film is then dried and stripped from the form and forms a rather flexible thin walled mold form which is indicated at 58 in FIG. 9.

Mold 58 is then placed in a cavity 60 in a rigid support member 62. The mold is supported in the cavity in the rigid support member during centrifuging and this is a necessary step because the mold is not self supporting, particularly in the presence of the pressures that are developed during centrifuging.

Figure 11:
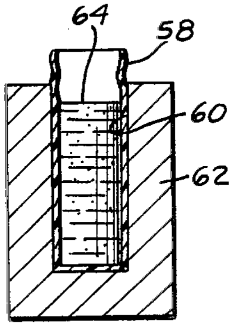
FIG. 11 is a view like FIG. 10 but shows the mold filled with slurry prior to centrifuging.
Figure 12:
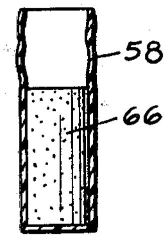
FIG. 12 is a view showing the mold and the compact after the centrifuging operation and after the supernatant liquid on top of the compact has been poured off.
Figure 13:
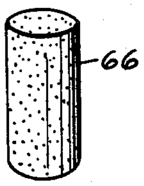
FIG. 13 is a perspective view showing the compact after removal thereof from the mold.

FIG. 11 shows that the supported mold 58 has received a charge 64 of slurry to be centrifuged, the said slurry consisting of a liquid fraction and a solid fraction in the form of fine particles. The mold remains in the support member 62 during centrifuging and then, following the centrifuging operation, is removed from the support member and the supernatant liquid resting on top of the compact is then poured off. In FIG. 12, the compact is designated at 66 and FIG. 13 shows the compact 66 after the mold has been stripped therefrom.

The practice of the invention, utilizing the arrangement of FIGS. 8 to 13, is useful for making simple shapes or compacts suitable for green machining to more complex shapes prior to sintering of the compact.

EXAMPLE V (Making Compacts Using Dipped Film)

In this case, the soluble mold consists of a thin but flexible plastic film which receives the slurry of powder and liquid vehicle and which is contained in a mold cavity of sufficient strength and rigidity to provide external support during centrifuging.

Upon completion of centrifuging, the clear supernatant liquid is decanted, and the thin plastic film with the compact still inside is removed from the supporting mold cavity, thus serving as a protective membrane and making it possible to remove the compact from the rigid supporting mold without surface damage or "pluck out." In effect, the plastic film acts as a parting agent between the compact and the mold wall.

After removal, the plastic film is wetted with a liquid which is a solvent for the film but is not miscible with the liquid vehicle solution used. The solvent causes the film to disintegrate and it is removed from the compact. When the film is polyvinyl alcohol, water is the solvent.

The thin plastic films are produced by a dipping technique in which forms of approximately the size and shape of the rigid mold cavity are repeatedly dipped in a liquid containing the plastic in solution. After a certain number of dippings, sufficient wall thickness will be built up to define the mold cavity. Excess liquid is then allowed to drain, and the film is dried and stripped from the dipping form. The plastic film is then placed inside the cavity of the rigid supporting mold, filled with slurry, and centrifuged.

The dipping solution used for making the polyvinyl alcohol film comprised the following:

| | | |
|---|---|---|
| Polyvinyl Alcohol - type 71-30 Manufactured by E. I. du Pont de Nemours & Co. | 9.6 | per cent by weight |
| Glycerol | 3.2 | per cent by weight |
| WXN - a surface agent manufactured by E. I. du Pont de Nemours & Co. | 2.8 | per cent by weight |
| Congo Red - a dyestuff which acts as a gelling agent | 0.3 | per cent by weight |
| Dowicide A - a germicide manufactured by Dow Chemical Co. | 0.2 | per cent by weight |
| Water | 83.9 | per cent by weight |

Solution above is held in an agitated tank maintained at 140° to 160° Fahrenheit into which the forms are dipped and allowed to drain.

After drying in air for several days using heat from infrared lamps the film is stripped from the dipping form and ready for use. At this stage, it is soft, pliable, free from pin holes and extremely strong.

| Slurry vehicle used comprised the following: | | |
|---|---|---|
| Perchloroethylene | 100.0 | milliliters |
| Paraffin wax having a melting point of about 137 degrees Fahrenheit | 0.625 | grams |
| (Elvax 260) Vinyl resin in the form of a copolymer of Ethylene and Vinyl Acetate (Du Pont) | 1.250 | grams |
| Arquad 2C-75) A Dialkyl) Quaternary Ammonium Chloride derived from a Fatty Acid (Armour Industrial Chemical) | 3.400 | grams |

This liquid vehicle has a gel point of about 33 degrees Fahrenheit.

The slurry was prepared by from 5.62 liters of the above liquid vehicle and 75.00 kilograms of a tungsten carbide powder mix containing the following:

| | |
|---|---|
| Cobalt | 5.5 weight per cent |
| Tantalum, Titanium, Niobium solid solution Carbides | 2.1 weight per cent |
| Tungsten Carbide | 92.4 weight per cent |

The powder mix when charged was 0.92 Fisher subsieve particle size. The liquid vehicle and powder were charged into a mill and milled for 16 hours at 115° Fahrenheit.

A plastic film 2 ¼ inches in diameter by 16 inches long was then inserted in the cavity of a rigid supporting mold of corresponding size and filled with slurry described above.

The mold was then centrifuged for 16 hours at 115° Fahrenheit at a rotational speed which produced centrifugal force equal to 300 times the force of gravity.

After centrifuging, the clear supernatant liquid was decanted and the mold, with the plastic film and compact inside, was held for 16 hours at a temperature of 10° Fahrenheit. The plastic film still containing the compact was then removed from the mold.

The film was then moistened with water. In about 30 minutes the film had been partially dissolved and was so weakened that it was easily removed from the compact without leaving any surface damage or "pluck out."

The compact was then dried for 3 days in air at 130° to 160° Fahrenheit. The dry compact was then encased in a liquid impervious film and hydropressed at 35,000 pounds per square inch. After this, the compact was machined to desired shape while still green, and the parts machined therefrom were sintered to final hardness.

The following tabulation of the five examples given above identify the type and purpose of the compacts formed thereby, the nature of the solid component in the slurry, the nature of the vehicle phase of the slurry, the specific binder material employed to hold the particles together after centrifuging, the mold material and the solvent for the mold material. In every case, the liquid fraction of the slurry is not a solvent for the mold material and is incompatible with the solvent for the mold material and thereby does not cause any damage to the compact.

where the hard end would be employed for the impacting and the tougher end would be employed for bonding the element to a holder.

The control of the properties of the compact in the described manner would, of course, obtain only for materials in which particles of different materials were present with the particles having different specific gravities so that the aforementioned relative migration of the particles could take place.

In a single material composition such as the example given for stainless steel and the example given for aluminum oxide, the particles are all of the same specific gravity and no relative migration would tend to take place and the concentration of the particles in the slurry would, therefore, not influence the characteristics of different parts of the compact after the centrifuging operation.

It has been mentioned above that work members made according to the present invention are improved in quality over work members made according to conventional pressing methods. The improvement is noted,

| Example | Type of Compact | Solid Component | Vehicle Solution | Binder | Mold Material | Solvent for Mold |
|---|---|---|---|---|---|---|
| I | Accurately Shaped Green Compact | WC-94.5% Co - 5.5% | Trichloroethane | Paraffin Wax - (Elvax) | Polyvinyl Alcohol | Water |
| II | Accurately Shaped Green Compact | WC-88.84 Co - 10.80 | Water | Polyvinyl Alcohol | Lucite | Methylene Chloride |
| III | Slug for Green Machining | Stainless Steel | Perchloroethylene | Paraffin Wax | Pclyvinyl Alcohol | Water |
| IV | Slug for Green Machining | Aluminum Oxide - $Al_2O_3$ | Methylene Chloride | Paraffin Wax | Polyvinyl Alcohol Film | Water |
| V | Slug for Green Machining | Co - 5.5% TaC etc - 2.1% WC-92.4% | Perchloroethylene | Paraffin Wax - (Elvax) | Polyvinyl Alcohol Film | Water |

In the examples given in the foregoing text, certain of the slurries contain mixtures of powders or particles as the solid fraction. Such mixtures, for example, can be tungsten carbide and cobalt. Other particles and mixtures are, of course, possible, and the specific examples given are not intended to be limiting in any way.

In any case, whenever a mixture of particles of any size is provided, there is a possibility that the particles will differ in specific gravity. For example, the tungsten carbide particles are much heavier than the cobalt particles. In this case, the concentration of the particles in the slurry is made great enough that there is little or no tendency for the carbide particles and cobalt particles to pass by each other during centrifuging and which can produce nonuniform distribution of the cobalt binder material and the tungsten carbide material in the compact.

However, the possibility presents itself of deliverately diluting the slurry by the addition of more liquid thereto so that the particles would be able to pass by each other at a controlled rate during centrifuging and thereby produce a compact in which the cobalt concentration varied from end to end in a predetermined manner.

By this expedient, a work member could be produced which was extremely hard at one end and graduated to a tougher composition at the other end. Such a compact might be useful for impact purposes or the like in particular, in connection with the transverse rupture strength and in the macro pit and flaw count. The transverse rupture strength is an important indication of the strength of the work member and the pit and flaw count is important because it indicates the degree of continuity of the work member.

When work members are employed for seal rings, mill rolls, extrusion punches and the like, for example, it is absolutely essential that the pit and flaw count be as low as possible because the presence of pits and flaws, if larger than a small size, can destroy the utility of the work member. Also, pits and flaws in a carbide work member form stress centers which can lead to premature fracturing of the work member under load.

The following table shows results obtained from powder batches in which each batch was divided into two parts, with one part being pressed by conventional methods and the other part of the same batch being compacted according to the present invention. In each case, the column marked A is the conventionally pressed samples and the column marked B indicates the samples compacted according to the present invention.

It will be noted that the transverse rupture strength of the samples made according to the present invention and the pit and flaw count are both substantially improved over what is obtained when compacting by conventional methods.

SUMMARY OF TRANSVERSE RUPTURE AND MACRO PIT AND FLAW DATA

| Method | | Case I Batch 740 A | Case I Batch 740 B | Case II Batch 515 A | Case II Batch 515 B | Case III Batch 980 A | Case III Batch 980 B | Case IV Batch 1571 A | Case IV Batch 1571 B |
|---|---|---|---|---|---|---|---|---|---|
| Transverse Rupture; | lbs./sq.in. / 1000 | | | | | | | | |
| Lowest Value | | 233 | 305 | 246 | 263 | 206 | 273 | 296 | 460 |
| Highest Value | | 330 | 431 | 347 | 424 | 349 | 410 | 487 | 491 |
| Average Value | | 271 | 371 | 298 | 369 | 283 | 340 | 398 | 477 |
| Hardness - RA | | 92.3 | 92.2 | 91.9 | 91.8 | 92.1 | 92.0 | 88.1 | 88.0 |
| Macro Pit and Flaw Count | | | | | | | | | |
| Total Pits and Flaws .004 in. and larger per 100 sq. in. | | 99 | 17 | 22 | 11 | 135 | 9 | 12 | .6 |

What is claimed is:

1. A method of making a sintered compact from particulate material which comprises; forming a flowable slurry of the particulate material and a liquid vehicle, said liquid vehicle including a holding agent to hold the particulate material in the compact together prior to sintering and a lubricant to promote free movement of the individual particles of the particulate material relative to each other during the centrifuging, placing the slurry in a mold which is closed on the bottom and on the sides and open only at the top and which is not soluble in said vehicle but which is soluble in a solvent different from any part of said vehicle, centrifuging the mold and the slurry contained therein to precipitate the particulate material with the open top of the mold facing the axis to form a compact which rests on the closed bottom of the mold, placing the mold and the compact therein into a bath of said solvent for the mold at least to soften the mold on the compact, removing the softened mold from the compact, drying the compact said solvent also being inert and immiscible with respect to said compact and the liquid fraction of said slurry and sintering the dried compact.

2. A method according to claim 1 in which the liquid vehicle in the mold from which the particulate material has been separated by centrifuging is poured from the mold prior to placing the mold and the compact therein into said solvent bath.

3. A method according to claim 1 in which said vehicle is water-free and said mold is soluble in water and said solvent is water.

4. A method according to claim 3 in which said vehicle is selected from the class of nonsolvents for polyvinyl alcohol which includes Trichlorethane, Perchlorethylene and Methylene Chloride, and said mold is polyvinyl alcohol.

5. A method according to claim 1 in which said vehicle gels at a predetermined temperature and is liquid above said temperature, carrying out said centrifuging above said predetermined temperature, and dissolving said mold at a temperature below said predetermined temperature.

6. A method according to claim 1 in which said vehicle comprises water and said mold is insoluble in water.

7. A method according to claim 6 in which said mold is methyl methacrylate (lucite) and said solvent is methylene chloride.

8. A method of making sintered compacts from powdered material which comprises; forming a flowable slurry of the powdered material and a liquid vehicle, said liquid vehicle including a holding agent to hold the particulate material in the compact together prior to sintering and a lubricant to promote free movement of the individual particles of the particulate material relative to each other during the centrifuging, making a mold having a cavity which is closed at the lower end and on the sides and open only at the upper end, said mold being made from a material which is insoluble in said liquid vehicle but which is soluble in a solvent which is inert to the powdered material and to the said vehicle, charging a predetermined quantity of the slurry into the cavity in the mold, centrifuging the charged mold with the open upper end of the cavity facing radially inwardly to cause the particles of the powdered material to collect in a single coherent mass in the form of a compact in the bottom end of the cavity which can be handled when removed from the mold cavity, placing the mold and the compact therein into a bath of the solvent for the mold at least to soften the mold on the compact, stripping the softened mold from the compact, and drying and sintering the compact said solvent also being inert and immiscible with respect to said compact and the liquid fraction of said slurry.

9. A method according to claim 8 in which the powdered material includes metal carbide and a binder metal therefor.

10. A method according to claim 8 in which the powdered material includes stainless steel.

11. A method according to claim 1 in which the powdered material includes aluminum oxide.

* * * * *

UNITED STATES PATENT OFFICE

CERTIFICATE OF CORRECTION

PATENT NO. : 3,888,662

DATED : June 10, 1975

INVENTOR(S) : Benjamin Clark Boeckeler

It is certified that error appears in the above-identified patent and that said Letters Patent are hereby corrected as shown below:

Column 19, withdraw lines 34 through 37 and replace by the following:

---ened mold from the compact, drying the compact and sintering the dried compact, said solvent also being inert and immiscible with respect to said compact and the liquid fraction of said slurry.---.

Signed and Sealed this thirtieth Day of September 1975

[SEAL]

Attest:

RUTH C. MASON
*Attesting Officer*

C. MARSHALL DANN
*Commissioner of Patents and Trademarks*